(12) United States Patent
Dufour et al.

(10) Patent No.: US 12,450,036 B2
(45) Date of Patent: Oct. 21, 2025

(54) SYSTEM AND METHOD FOR SCRIPTING GENERATORS

(71) Applicant: ARTERIS, INC., Campbell, CA (US)

(72) Inventors: Guillaume Dufour, Ermont (FR); Jean Pascal Lim, Cachan (FR); Arnault Leprevostcorvellec, Paris (FR)

(73) Assignee: ARTERIS, INC., Campbell, CA (US)

( * ) Notice: Subject to any disclaimer, the term of this patent is extended or adjusted under 35 U.S.C. 154(b) by 23 days.

(21) Appl. No.: 17/894,160

(22) Filed: Aug. 24, 2022

(65) Prior Publication Data

US 2023/0102570 A1  Mar. 30, 2023

Related U.S. Application Data (60) Provisional application No. 63/249,031, filed on Sep. 28, 2021.

(51) Int. Cl.
*G06F 8/35* (2018.01)
*G06F 9/54* (2006.01)

(52) U.S. Cl.
CPC .............. *G06F 8/35* (2013.01); *G06F 9/541* (2013.01)

(58) Field of Classification Search
CPC ........ G06F 8/35; G06F 9/541; G06F 9/45512; G05F 8/30
See application file for complete search history.

(56) References Cited

U.S. PATENT DOCUMENTS

| | | | | |
|---|---|---|---|---|
| 8,266,588 B2 * | 9/2012 | Abdelhadi | ............... | G06F 8/71 717/115 |
| 9,514,106 B2 * | 12/2016 | Yamamoto | ........... | G06F 40/143 |
| 10,412,022 B1 * | 9/2019 | Tang | ..................... | H04L 47/781 |
| 10,521,195 B1 * | 12/2019 | Swope | ....................... | G06F 9/54 |
| 10,831,744 B1 * | 11/2020 | Harris | ................... | G06F 16/219 |
| 2015/0186193 A1 * | 7/2015 | Jain | ......................... | G06F 9/541 719/328 |
| 2016/0173481 A1 * | 6/2016 | Kwon | ................... | H04L 63/083 726/6 |
| 2016/0291942 A1 * | 10/2016 | Hutchison | ............... | G06F 8/311 |
| 2017/0102925 A1 * | 4/2017 | Ali | ............................ | G06F 8/30 |
| 2017/0289060 A1 * | 10/2017 | Aftab | .................. | H04L 67/1097 |
| 2019/0180041 A1 * | 6/2019 | Bhunia | .................... | G06F 13/28 |
| 2019/0272169 A1 * | 9/2019 | Russell | ..................... | G06F 8/35 |
| 2020/0226009 A1 * | 7/2020 | Bachmutsky | ......... | G06F 9/5038 |
| 2020/0274900 A1 * | 8/2020 | Vaishnavi | ............... | H04L 63/20 |
| 2020/0387415 A1 * | 12/2020 | Take | ..................... | G06Q 50/10 |
| 2021/0279115 A1 * | 9/2021 | Aspro | ....................... | G06F 8/30 |

OTHER PUBLICATIONS

NPL (How to document you Java REST API, Sep. 26, 2020) (Year: 2020).*

* cited by examiner

*Primary Examiner* — Noor Alkhateeb
(74) *Attorney, Agent, or Firm* — Dana Legal Services (57) ABSTRACT

A system (and method) is disclosed that automate creating a scripting library in a variety of programming languages. The system uses a process that generates a web scripting. The system generates a description of the application programming interface (API). The API description may be created using any one of: Java source code (e.g., Javadoc) to create an OpenAPI (e.g., swagger) description of the API; or the API description is created in any format capable of being read by a computer (e.g., XML, JSON, YAML, etc.).

11 Claims, 9 Drawing Sheets

SYSTEM AND METHOD FOR SCRIPTING GENERATORS

CROSS REFERENCE TO RELATED APPLICATIONS

The present application claims the benefit of U.S. PROVISIONAL APPLICATION Ser. No. 63/249,031 filed on Sep. 28, 2021 by Guillaume DUFOUR et al. and titled SCRIPTING GENERATORS, the entire disclosure of which is incorporated herein by reference.

TECHNICAL FIELD

The present technology is in the field of computer system design and, more specifically, related to scripting while designing an integrated circuit (IC) that includes an interconnect as part of a system-on-chip (SoC).

BACKGROUND

When a system designer is creating modern integrated circuits (ICs), (e.g., system-on-chip (SoC)), the process typically involves connecting multiple components or IP blocks (e.g., processor core, memory, etc.). As assembly of ICs includes multiple iterations and frequent design adjustments, it is advantageous to script the design process.

Typically, each IC designer has a different design flow and preference for the programming language scripts that they are written. To accommodate this need, IC design tool vendors commonly implement scripting in a variety of programming languages. The current tool development flow is to write a custom library for each programming language. Creating a custom library for each programming language can be both time consuming and error prone. Therefore, what is needed is a system and method to automate creating a scripting library in a variety of programing languages that are used to design an IC.

SUMMARY

In accordance with various embodiments and aspects of the invention, systems and methods are disclosed that automate creating a scripting library in a variety of programing languages. The system uses a process that generates a web scripting. The system generates a description of the application programming interface (API). The API description may be created using any one of: Java source code (e.g., Javadoc) to create an OpenAPI (e.g., swagger) description of the API; or the API description is created in any format capable of being read by a computer (e.g., XML, JSON, YAML, etc.).

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrates various aspects and embodiments of the invention. Generally, examples can be used to in any combination to describe aspects of the invention. All statements herein reciting principles, aspects, and embodiments (as well as specific examples thereof) are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," "in some embodiments," and similar language herein may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The terms "source," "master," and "initiator" refer to hardware intellectual property (IP) modules/blocks or units; these terms are used interchangeably within the scope and embodiments of the invention. As used herein, the terms "sink," "slave," and "target" refer to hardware IP modules or units and the terms are used interchangeably within the scope and embodiments of the invention. As used herein, a transaction may be a request transaction or a response transaction. Examples of request transactions include write request and read request.

As used herein, "call directly" or "direct call" is used to describe a type call in a specific runtime environment. For example, when the system wants to call the create method from the project's application programing interfaces (APIs) and the code is in java, the core library code is in the same environment of the customer script, and the process, which is executed by the system, does a direct call as follows: project.create ("MyProject")

In accordance with some aspects and embodiments of the invention, the direct call does not integrate the customer script inside the application environment (JVM runtime), because when the system creates, builds and packages the application, the system does not know the customer script; each customer can do really different script for different needs.

In accordance with some aspects of the invention, if there is a different language (e.g., the core library is in java and the customer script in python), then the system can integrate an interpreter close to the code library to permit a direct call from the python customer script to the java core library methods. This is also a call directly or direct call.

In accordance with some aspects and embodiments of the invention, the customer script has a dedicated runtime environment that is not link to the runtime environment of the core library methods. When the system calls a method in the customer script, the system calls the server through the REST layer (HTTP), which is not a direct call because it is a different runtime environment.

Figure 1:
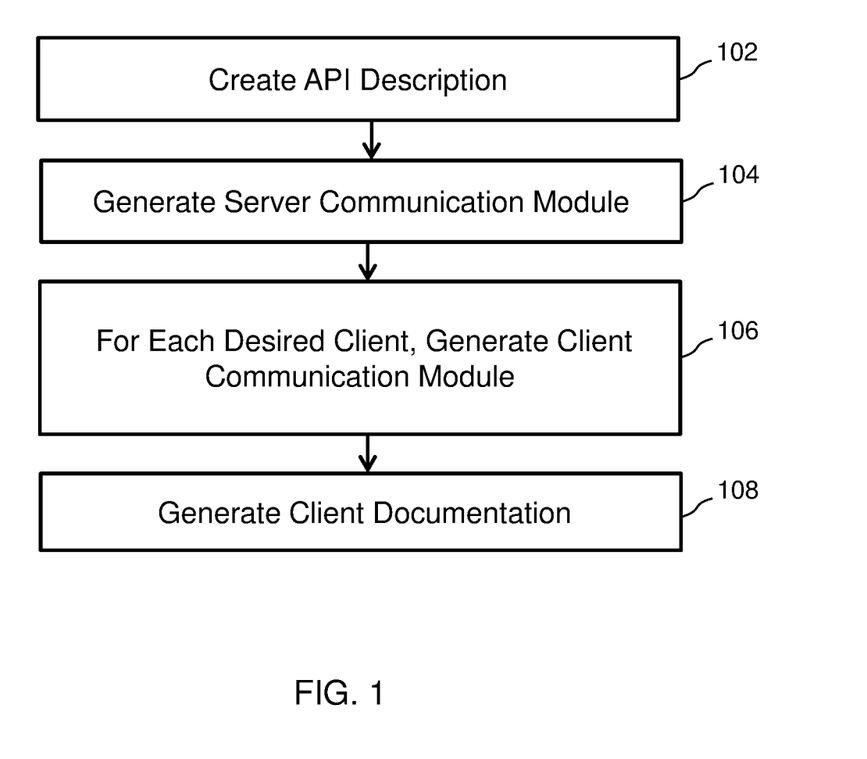
FIG. 1 shows a process of generating a web scripting system in accordance with the various aspects and embodiments of the invention.

Referring now to FIG. 1, a process is shown for generating a web scripting system in accordance with the various aspects and embodiments of the invention. At step 102, a description of the application programming interface (API) is created. According to one or more aspects and embodiments of the invention, an API description may be created by examining a web service. In accordance with some aspects and embodiments of the invention, the API is created from source code and modules are created that run on the server and client. The process disclose provides a targeted language native API that matches with a specific API end point. For example:

```
po1# Get the service resource
   sqs = boto3.resource('project')
   # Get the queue
   queue = sqs.get_queue_by_name(QueueName='test')
   # Create a new message
      response = queue.send_message(MessageBody='getAllproject')
   # The response is NOT a resource, but gives you a message ID
      print(response.get('MessageId'))
```

According to one or more aspects and embodiments of the invention, Java source code (e.g., Javadoc) is used to create an OpenAPI (e.g., swagger) description of the API. According to one or more aspects and embodiments of the invention, the API description may be created in any format capable of being read by a computer (e.g., XML, JSON, YAML, etc.).

At step 104, a server communication module is generated using the API description. Each description of a documented method (for example a JavaDoc) is read by method and each service by service. For each method, the system generates one REST sub-path controller. For each service, the system generates a REST controller that manages one root path. The REST is chosen according to the method name matching and return type. According to one or more aspects and embodiments of the invention, the server communication module enables API communication between a service running on a server and a client service. According to one or more aspects and embodiments of the invention, the server communication module uses REpresentational State Transfer (REST) protocol.

At step 106, for each desired client library (e.g., TCL library, Python library, Java library, etc.), a client communication module is generated using the API description. In accordance with various aspects and embodiments of the invention, for each documented method, the system generates a client method that calls a sub-path previously created by the server communication module. In accordance with various aspects and embodiments of the invention, the sub-path may be the method name. Each client communication module can communication with the server communication module. According to some aspects and embodiments, at step 108, for each desired client library, client documentation is generated based on the API description. In accordance with some aspects and embodiments of the invention, the system uses a polyglot of swagger to produce multiple client libraries. In accordance with some aspects of the invention, a polyglot is a computer program or script written in a valid form of multiple programming languages, which performs the same operations or output independent of the programming language used to compile or interpret it. The system integrates each client library in a standard IDE to hide the REST part and, thus, permit the customer or user to use all features of language without the limitations of an interpreter. In accordance with some aspects and embodiments of the invention, the system creates a template by selected language and the template includes a template of scripts, dependencies declarations, and a launch configuration.

Figure 2A:
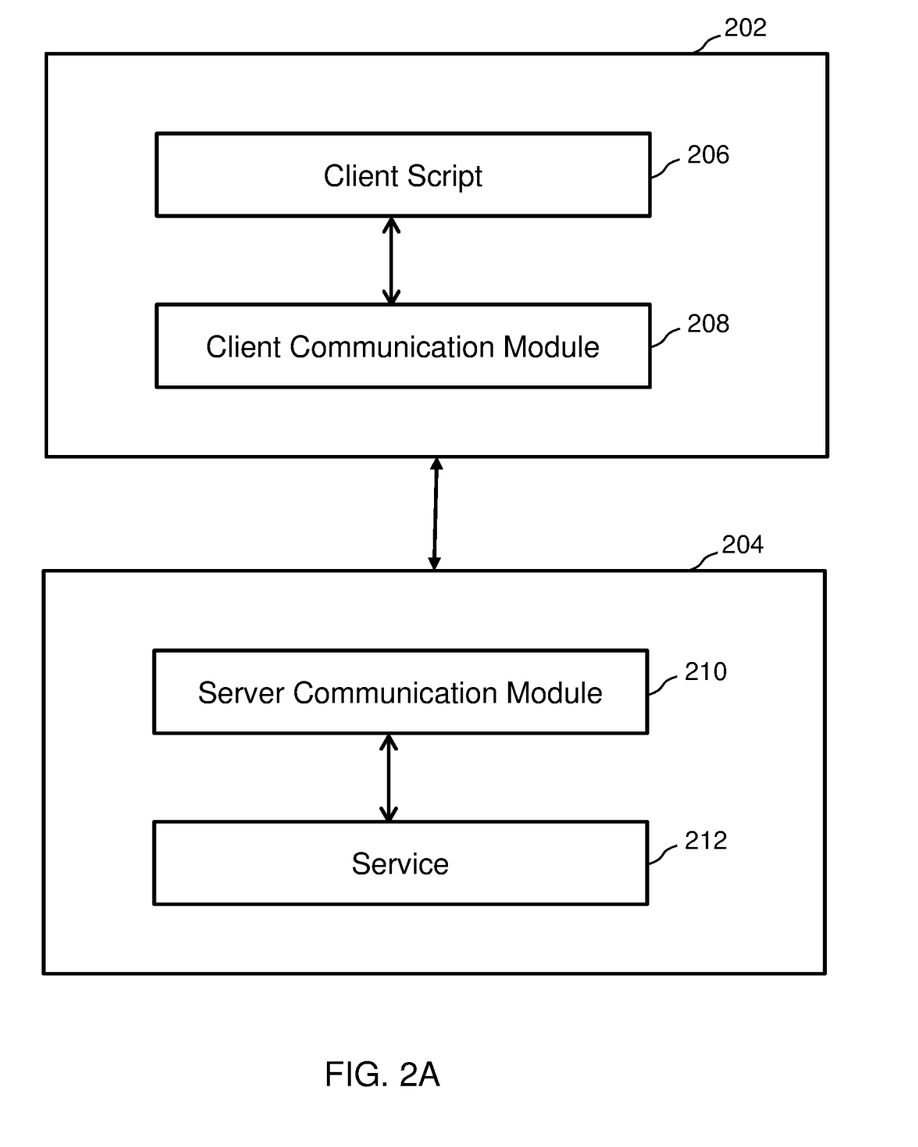
FIG. 2A shows a web scripting system in accordance with the various aspects and embodiments of the invention.

Referring now to FIG. 2A, a system is shown for web scripting in accordance with the various aspects and embodiments of the invention. Client 202 communicates with server 204. According to one or more aspects and embodiments of the invention, communication between client 202 and server 204 is performed using a REST protocol.

In accordance with some aspects of the invention, the system overrides some part of OpenAPI (swagger) to configure the REST client to read address of server (the port of the server) from the operating system environment variable. This way the customer does not need to configure anything to contact the server. When the customer imports the client library and use it, it works without any modification; a turn-key solution out of the box. The script can call any method without any configuration.

Client 202 includes client script 206 and client communication module 208. When a client script 206 is executed on client 202, client script 206 connects with client communication module 208 and services needed on server 204 are routed through the client communication module 208. The client communication module 208 communicates with server 204 using server communication module 210.

Server 204 includes server communication module 210 and service 212. Client 202 communicates with server 204 using server communication module 210. For example, client script 206 may request a list of intellectual property (IP) blocks within a design. Client script 206 submits this request to client communication module 208. Client communication module 208 then transmits this request to server communication module 210. Server communication module 210 submits this request to service 212. Service 212 determines a list of IP blocks. The list of IP blocks is transmitted to server communication module 210 then to client communication module 208 and then to client script 206. According to one or more aspects and embodiments of the invention, the list of IP blocks is an information block accessible in the customer script. Based on this information, the script can choose what to do. Further, the same script can be used on different design/IP or SoC, which was previously created. So for example, the system can use the script to export all ports present in an Intellectual Property (IP) block on the design or create an interconnect IP block and connect all of the ports to it. According to one or more aspects and embodiments of the invention, a customer can choose what to do with the data that is used to generated the script. According to one or more aspects and embodiments of the invention, the system can provide a scripting way to manage customer data, such as data related to SoC, IP block, design parameters/constraints, and documentation.

According to one or more aspects and embodiments of the invention, client 202 and server 204 are remote to each other (e.g., client 202 is a user's computer, and server 204 is in a server room or in a remote data center). According to one or more aspects and embodiments of the invention, client 202 and server 204 are the same computer (e.g., user's computer, data center computer, etc.). According to one or more aspects and embodiments of the invention, client 202 and server 204 can use web technology to communicate.

Figure 2B:
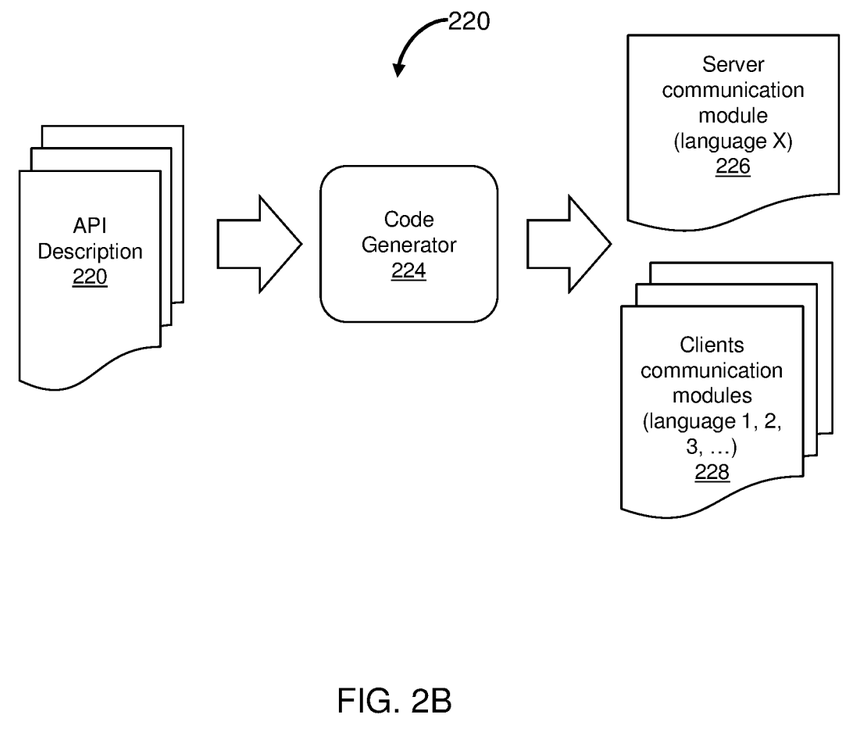
FIG. 2B shows a process for using web scripting in accordance with the various aspects and embodiments of the invention.

Referring now to FIG. 2B, a process 220 is shown wherein an API description 220 is provided as an input to a code generator 224. The code generator 224 produces an output for a server communication module 226 (outline in detail herein) in language X, which can be any language identified for the module 226. The code generator 334 also provides an out for communication with a client communication modules 228 (outlined in detail herein) in various languages.

Figure 2C:
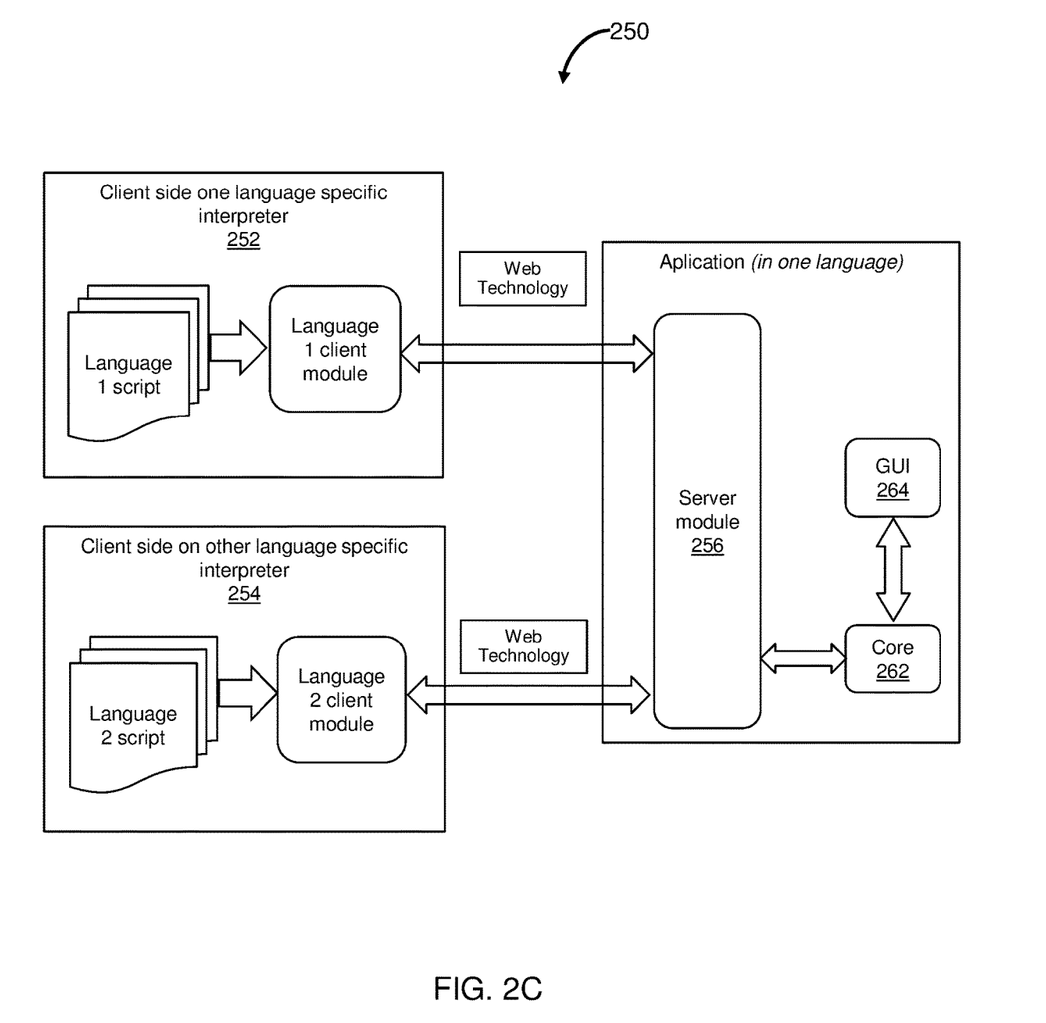
FIG. 2C shows web scripting between multiple clients in various languages and a server module in accordance with the various aspects and embodiments of the invention.

Referring now to FIG. 2C, a system 250 is shown that includes client modules 252 and 254 in communication with a server module 256. The client module 256 is in communication with a core 262; the core 262 is in communication with a graphical user-interface (GUI) 264. In accordance with some aspects and embodiments of the invention, the language for the client module is different from the language for the server module; the client is used to provide data in an application, even though it is not necessarily used directly by the user of the application. Thus, polyglotism of an OpenAPI generator is used to provide one client the language used by the application user. The client is integrated inside a stand integrated development environment (IDE) so that the client can be used directly by the user. The needed OpenAPI source is generated by the system directly using the code's comments (e.g., JavaDOC)

Figure 3A:
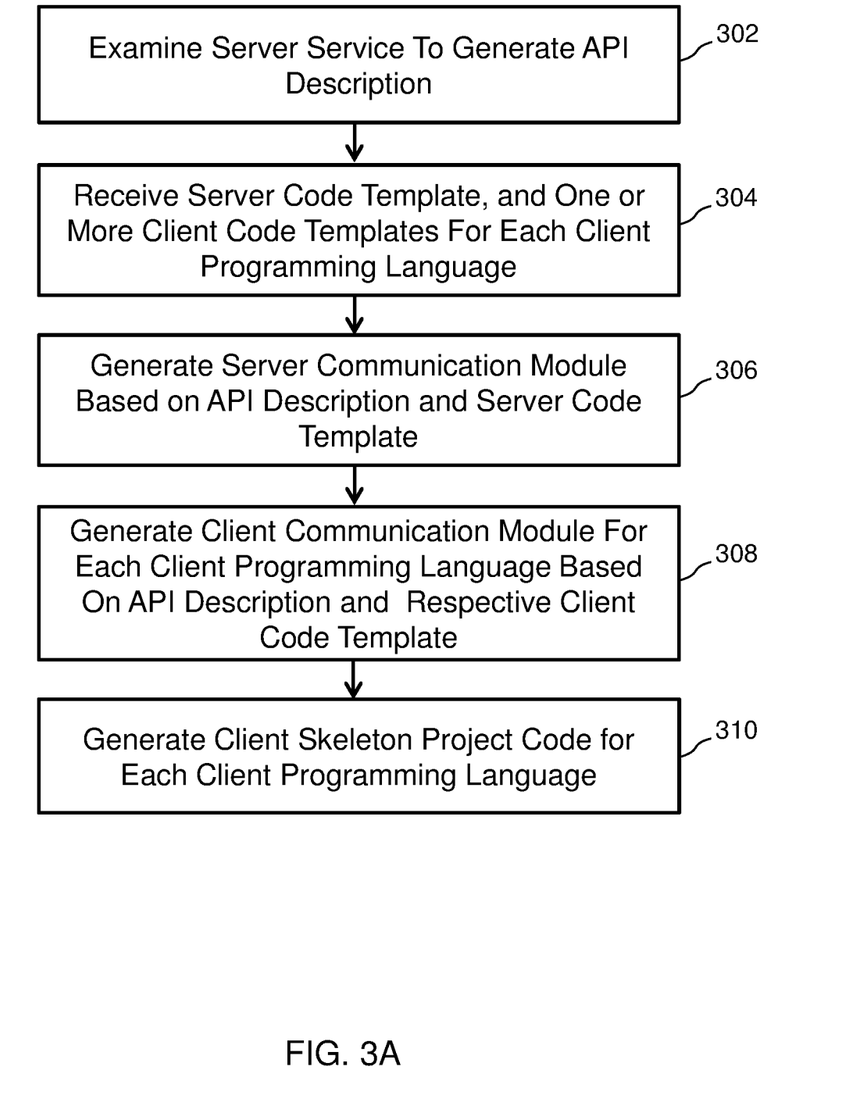
FIG. 3A shows a process of generating a web scripting system in accordance with the various aspects and embodiments of the invention.

Referring now to FIG. 3A, a process is shown for generating a web scripting system in accordance with the various aspects and embodiments of the invention. At step 302, a server service is examined to generate an API description. For example, Java source code may be examined to generate an API description (e.g. OpenAPI/Swagger description). According to one or more aspects and embodiments of the invention, multiple files are created to describe the API, for example a service file and an operation by method file. According to one or more aspects and embodiments of the invention, for one service: a web controller interface file that describes the REST endpoints (one by method), a controller that implement the interface to delegate to a service, a service interface that defines the service available method, and a service implementation with all method implemented. The implementation method converts all web parameter to the target type and calls the real core service, which is injected by the web application framework. According to one or more aspects and embodiments of the invention, the system does not generate configuration data/file, so the system must configure the web application framework to inject real core services in all web services.

At step 304, a service code template and one or more client code templates for each client programming language is received. According to one or more aspects and embodiments of the invention, the service code template and the one or more client code templates include hostname and port number. According to one or more aspects and embodiments of the invention, the service code template and the one or more client code templates include variables that are determined at run time (e.g., server URL).

At step 306, a server communication module is generated based on the API description and the service code template. According to one or more aspects and embodiments of the invention, the server communication module may be generated based on the API description (e.g., swagger file).

At step 308, a client communication module is generated for each client programming language based on the API description and the respective client code template. According to one or more aspects and embodiments of the invention, the client communication module is generated using a Maven plugin and the API description (e.g., swagger file).

At step 310, a client skeleton project code for each programming language is generated from the respective client template. According to one or more aspects and embodiments of the invention, the customer selects an available workspace on their file system (local hard drive or network file system). Then the customer chooses a project name and language and the system generates a directory name. The system generates a script file example, which can call all available API or do nothing, and a configuration, which includes client libraries and launch configuration. The client skeleton project code gives a client script creator a starting point to write a script using services and is used in IDE to launch configuration.

Figure 3B:
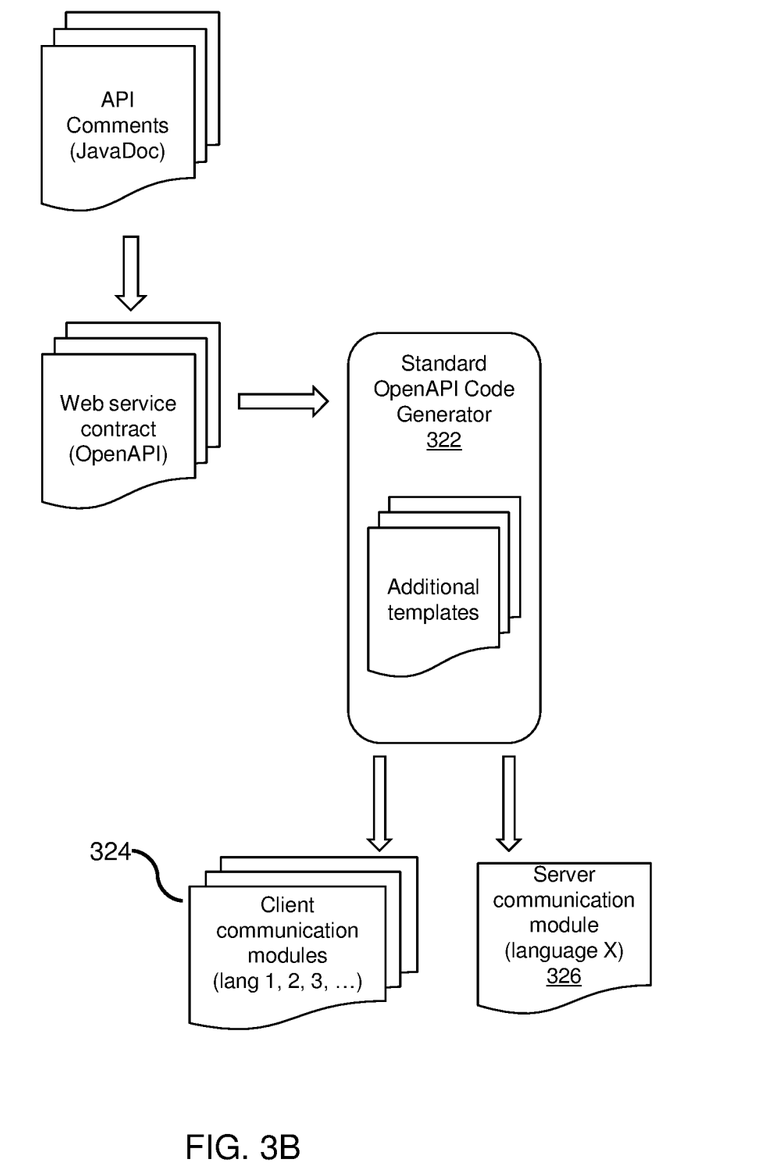
FIG. 3B shows an implementation in accordance with the various aspects and embodiments of the invention.

Referring now to FIG. 3B, a generator 322 is shown in communication with client communication modules 324 and a server communication module 326. As noted herein, the API comments (JavaDoc) are received along with the web service contract (OpenAPI) are provided to the generator 322. The generator 322 includes additional templates for generation of the necessary script in the required language. The generator provides scripts to client communication modules 324 and a server communication module. The system receives a JavaDoc and, using a JavaDoc parser, the system generates OpenAPI files. In accordance with some aspects of the invention, one file is by service and one file is operation by method. Then the system adds a code server template to do the link to a web service and to the client service, such as REST controller link to service. The system adds a client code template to define how the system gets the server address, such as hostname and port. The system uses polyglot swagger to generate client implementations and a server implementation. The system starts a web server inside the system's tools and provides the port information to a development environment, wherein the system's tool creates a project generator based on additional templates that integrate the client library generated inside the customer project. The system generates a launch configuration in each different language and puts the port information within the launch configuration.

Figure 4A:
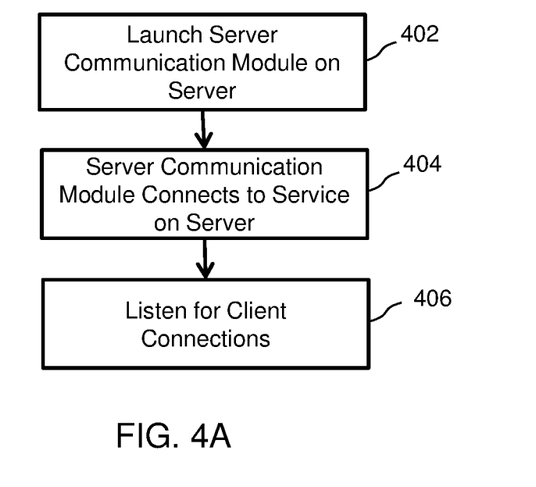
FIG. 4A shows a process of launching a server communication module in accordance with the various aspects and embodiments of the invention.

Referring now to FIG. 4A, a process is shown for generating a web scripting system in accordance with the various aspects and embodiments of the invention. At step 402, the server communication module is launched on a server. At step 404, the server communication module connects to a service on the server. At step 406, the communication module listens for (or detects) client connections. When a client connection is established, access to the service is provided by the server communication module to the client connection.

Figure 4B:
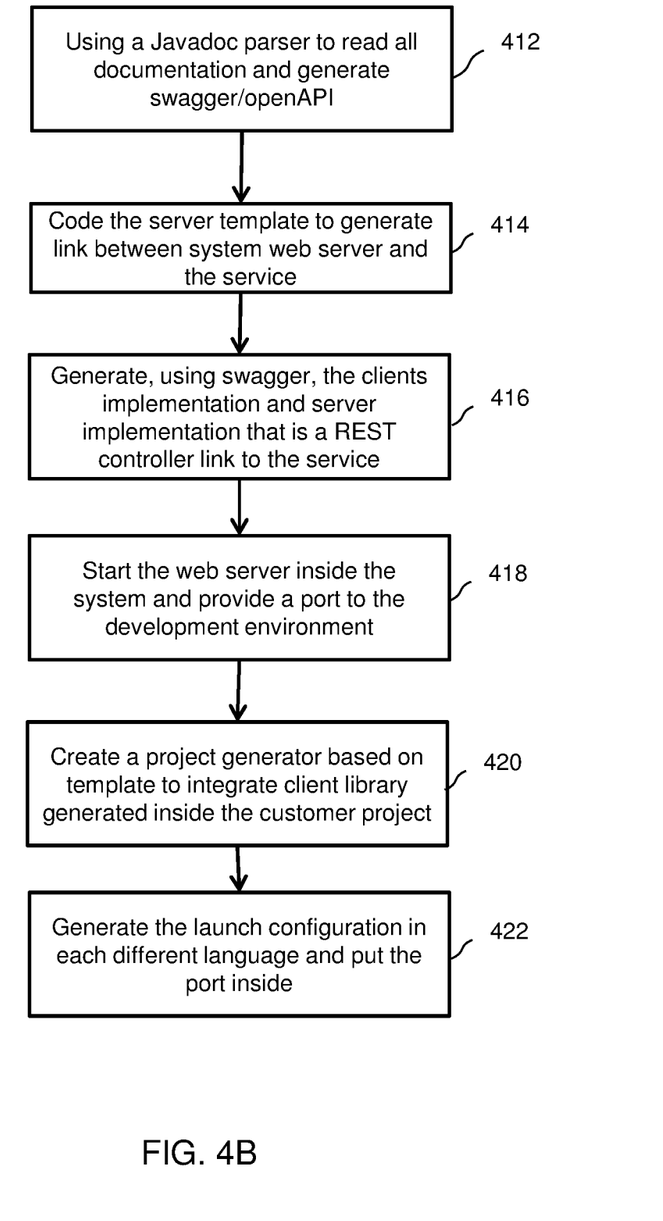
FIG. 4B shows a process for generating a launch configuration in accordance with the various aspects and embodiments of the invention.

Referring now to FIG. 4B, a process is shown for generating a launch configuration in accordance with the various aspects and embodiments of the invention. A step 412 a parser reads documentation and generates swagger/openAPI. At step 414, the process codes the server template to generate a link between the web server and the service. At step 216, the process generates the client and server implementation that is a REST controller link to the services. At step 418, the process starts the web server inside the system and provides a port to the development environment. At step 420, the process creates a project generator based on the template to integrate a client library generated inside the customer project. At step 422 the process generates the launch configuration in each of the different languages.

Figure 5:
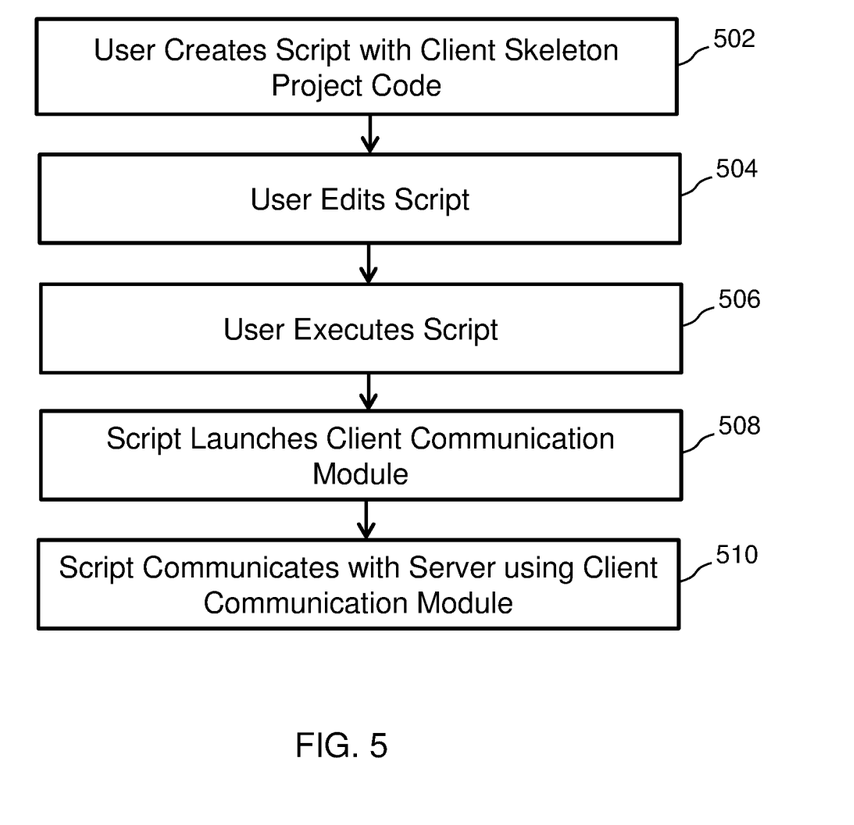
FIG. 5 shows an example of a user using a web scripting system accordance with the various aspects and embodiments of the invention.

Referring now to FIG. 5, shown is an example of a user using a web scripting system in accordance with the various aspects and embodiments of the invention. At step 502, a user creates a script using the client skeleton project code. According to one or more aspects and embodiments of the invention, the user creates the skeleton project code. The system uses the skeleton project code to create a customer script example, which is capable of calling all available application programing interfaces (APIs) and/or take no action. At step 504, the user edits the script. For example, the user can instruct the script to get a list of all the IP blocks in a design. At step 506 the script is executed. At step 508, the script launches the client communication module in accordance with one or more aspects and embodiments of the invention. The client communication module establishes a connection with the server communication module. According to one or more aspects and embodiments of the invention, the client communication module has been previously launched and the script connects to the client communication module. At step 510, the script communicates with the server using the client communication module. For example, the script may request a list of all the IP blocks in a design. Client communication module sends the request to the server via the server communication module. The server service responds to the request with a list of IP blocks in a design. The response is transmitted to server communication module, to the client communication module, and to the script. According to one or more aspects and embodiments of the invention, creating the script, running the script, and/or debugging the script my be performed in an integrated development environment (IDE). According to one or more aspects and embodiments of the invention, two or more client libraries are integrated into the same environment (e.g., IDE).

Certain methods according to the various aspects of the invention may be performed by instructions that are stored upon a non-transitory computer readable medium, for example memory. The non-transitory computer readable medium stores code including instructions that, if executed by one or more processors, would cause a system or computer to perform steps of the method described herein, including methods performed by a module, such as the modules described herein. The non-transitory computer readable medium includes: a rotating magnetic disk, a rotating optical disk, a flash random access memory (RAM) chip, and other mechanically moving or solid-state storage media/medium.

Any type of computer-readable medium is appropriate for storing code comprising instructions according to various example. Some examples are one or more non-transitory computer readable media arranged to store such instructions for methods described herein. Additionally, modules may be represented by codes stored in non-transitory media or represented by hardware components that performs a specific function. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations.

Descriptions herein reciting principles, aspects, and embodiments encompass both structural and functional equivalents thereof. Elements described herein as coupled have an effectual relationship realizable by a direct connection or indirectly with one or more other intervening elements.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, Wi-Fi, 3G, 4G long-term evolution (LTE), 5G, and other wireless interface standard radios. The IP block or element may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-field protocols, or RFID.

The scope of the invention, therefore, is not intended to be limited to the exemplary embodiments shown and described herein. Rather, the scope and spirit of present invention is embodied by the appended claims.

What is claimed is:

1. A design tool for generating a web script, the design tool comprising:
   a memory for storing code; and
   a processor in communication with the memory, wherein the processor executes the code that causes the design tool system to:
   receive comments in a form of a JavaDoc generated using a polyglot swagger to define at least one standard language agnostic interface for a REpresentational State Transfer (REST) application programming interface (API) and the REST API is configured to read addresses of a server;
   generate a plurality of client libraries based on the polyglot swagger; and
   produce at least one template of scripts that integrates each client library in a standard integrated development environment (IDE),
   wherein the at least one template of scripts include all ports of at least one intellectual property (IP) block,
   wherein the design tool makes a direct call to an interpreter, which accesses the at least one template of scripts that identify connections to the at least one IP block, that perform at least one of:
   exporting all ports of the at least one IP block; and
   creating an interconnect IP block having connections to all ports of the at least one IP block,
   wherein the design tool uses all features of the at least one template of scripts through the direct call to the interpreter,
   wherein the design tool's use of the at least one template of scripts a programming language is independent of the programming language associated with a server communication module, and
   wherein the at least one template includes dependencies declarations and a launch configuration.

2. The design tool of claim 1 further comprising code that causes the design tool to define an API description.

3. The design tool of claim 2 further comprising code that causes the design tool to generate client modules for at least one client programming language.

4. The design tool of claim 1 further comprising code that causes the design tool to generate a server communication module based on an API description.

5. The design tool of claim 1 further comprising code that causes the design tool to generate client communication module for a client programming language.

6. The design tool of claim 1 further comprising code that causes the design tool to:
   deploy a server communication module for a server; and
   map an API description for any user to the server.

7. The design tool of claim 1 further comprising code that causes the design tool to generate, based on an API description, a client communication module that is capable of communicating with a server module, wherein the server module has an application language that is in one language using a specific script.

8. The design tool of claim 1 further comprising code that causes the design tool to provide a script API to a user in order to allow the user to access an application.

9. The design tool of claim 8 further comprising code that causes the design tool to utilize a REST API as a list of core descriptions.

10. The design tool of claim 8 further comprising code that causes the design tool to generate core clients capable of using any language to communicate with a remote system.

11. A non-transitory computer readable medium for storing code, which is executed by a processor to cause a design tool to:
    receive JavaDoc generated comments based on a polyglot swagger to define at least one standard language agnostic interface for a REpresentational State Transfer (REST) application programming interface (API) and the REST API is configured to read addresses of a server;
    generate a plurality of client libraries based on the polyglot swagger;
    produce at least one template of scripts for each client library of the plurality of client libraries and integrate each client library in a standard integrated development environment (IDE), wherein at least one template of scripts includes dependencies declarations and launch configurations and at least one second template of scripts include all ports of at least one intellectual property (IP) block;
    make a direct call to an interpreter that accesses the template of scripts to identify connections to the at least one IP block, that perform at least one of:
    exporting all ports of the at least one IP block; and
    creating an interconnect IP block having connections to all ports of the at least one IP block, independent of a client programming language associated with a client of a server programming language;
    generate client modules for the client programming language;
    generate a server communication module based on an API description and the server programming language;
    deploy the server communication module; and
    map the API description to a server, wherein client modules, which use a client programming language, communicate with the server communication module, which uses the server programming language.

* * * * *